(12) United States Patent
Nishijima et al.

(10) Patent No.: US 6,276,165 B1
(45) Date of Patent: Aug. 21, 2001

(54) AIR CONDENSER, COOLANT SYSTEM, AND ON VEHICLE AIR CONDITIONING SYSTEM

(75) Inventors: Hideya Nishijima; Toshiyuki Higuchi, both of Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/552,656

(22) Filed: Apr. 19, 2000

(30) Foreign Application Priority Data

Apr. 23, 1999 (JP) .................................................. 11-117232

(51) Int. Cl.[7] .................................................. F25B 43/02
(52) U.S. Cl. .............................................................. 62/473
(58) Field of Search .............................. 62/468, 470, 473, 62/84

(56) References Cited

U.S. PATENT DOCUMENTS

| 3,494,146 | * | 2/1970 | Valbjorn | 62/473 |
| 5,001,908 | * | 3/1991 | Mayer | 62/470 |
| 5,394,710 | * | 3/1995 | Matsuo et al. | 62/509 |

* cited by examiner

*Primary Examiner*—Michael Pwell Buiz
*Assistant Examiner*—Mohammad M. Ali
(74) *Attorney, Agent, or Firm*—Oblon, Spivak, McClelland, Maier & Neustadt, P.c.

(57) ABSTRACT

A condenser capable of separating oil is provided, including a mesh 80 disposed at the opening 75a of a coolant inlet 75 in a header 72 in which the coolant inlet 75 is provided, and a return path 78, communicating with an intake side of a compressor, is provided at the lower side of the coolant inlet 75 in the header 72.

11 Claims, 5 Drawing Sheets

AIR CONDENSER, COOLANT SYSTEM, AND ON VEHICLE AIR CONDITIONING SYSTEM

BACKGROUND OF THE INVENTION

1. Field of the Invention

The present invention relates to a condenser, a coolant system, and an on vehicle air conditioning system.

2. Background Art

As is commonly known, an on vehicle air conditioning system includes a blower fan, an air conditioning unit provided with a heater core for heating type air conditioning, and various types of dampers, a heat source system for introducing high temperature cooling water into the air conditioning system, a coolant system for supplying coolant to an evaporator in the air conditioning unit, and a controller for controlling operations of the on vehicle air conditioning system in response to various conditions determined by the driver's choice such as the temperature.

The coolant system usually includes a compressor for feeding a coolant gas and, in order to lubricate the compressor, it is usual to circulate oil corresponding to several percent of the flow rate of the coolant in the coolant system.

A conventional example of the coolant system is described with reference to FIG. 7. In FIG. 7, the reference numeral 100 denotes a compressor. The compressor 100 has the function of compressing the low temperature and low pressure coolant gas which has been evaporated in an evaporator 101 by absorbing heat in a compartment of the vehicle, and forwarding the coolant as high temperature and high pressure gas coolant.

In the condenser 102, the high temperature and high pressure gas coolant supplied from the compressor 100 is condensed into liquid through condensation and liquefaction by cooling the gaseous coolant by outside air. The thus liquefied coolant is sent to the receiver 103 to be subjected to gas liquid separation and then supplied to an expansion valve (not shown) as high temperature and high pressure coolant. In this expansion valve, the high temperature and high pressure coolant is subjected to pressure reduction and expansion, so that the coolant is converted into the low temperature and low pressure liquid (atomized) coolant and supplied to the evaporator 101. In addition, an oil separator 104 is provided at the discharge side of the compressor 100.

The oil separator 104 is provided in the compressor at the discharge side, where the oil is necessary. The coolant system is constituted such that the oil separated and collected at the discharge side of the compressor is again supplied to the intake side of the compressor.

Since provision of the oil separator allows recovery of the oil before the condenser 102, an advantageous feature of the conventional on vehicle air conditioning system is obtained in that it is possible to prevent reduction of the heat efficiency due to adhesion of oil on the heat exchanging surfaces of the condenser 102 and to prevent an increase of the boiling temperature of the coolant by incorporation of oil in the coolant. However, a problem is encountered that there may be no space to provide even a small part in the engine compartment of a vehicle, since it is fully occupied by various accessories, which causes the problem that the addition of the oil separator to the engine compartment may not be possible.

As measure to respond to the above problem, it has been considered to integrate the oil separator 104 with the compressor 100. However, since the oil separator 104 requires a certain space for gas-liquid separation, it is not possible to reduce the volume of the oil separator 104 by merely integrating with the compressor, and the problem of space remains.

SUMMARY OF THE INVENTION

It is therefore an objective of the present invention to provide a condenser, a coolant system, and an on vehicle air conditioning system which has the function of separating oil from the coolant.

According to the first aspect of the present invention, a condenser is provided, in which left and right headers are connected with coolant tubes and fins, comprising: a mesh disposed at an opening of a coolant inlet in one of said headers, in which at least the coolant inlet is provided: and a return path, which communicates with an intake side of a compressor, is disposed at the lower side of the coolant inlet of said header.

According to the second aspect, a condenser is provided, in which left and right headers are connected with coolant tubes and fins, wherein at least one of the headers provided with said coolant inlet is formed in a cylindrical form; the coolant inlet fitted at said header is formed so as to receive the coolant from a direction along a peripheral wall of the header; and a return path, communicating with the intake side of the compressor, is disposed at the lower side of the coolant inlet of the header.

According to the third aspect of the present invention, in a condenser according to the second aspect, an end portion of the opening of said coolant inlet protrudes towards the inside of the header.

According to the fourth aspect, in a condenser according to the second aspect, a mesh is provided at the opening of said coolant inlet in the header.

According to the fifth aspect, in a condenser according to any one of the first and second aspects, a restrictor is provided in said return path.

According to the sixth aspect, a coolant system of the present invention includes at least a condenser according to any one of claims 1 to 5 and an evaporator.

According to the seventh aspect, an on vehicle air conditioning system is provided which includes a condenser according to any one of claims 1 to 5.

DETAILED DESCRIPTION OF THE INVENTION

Figure 4:
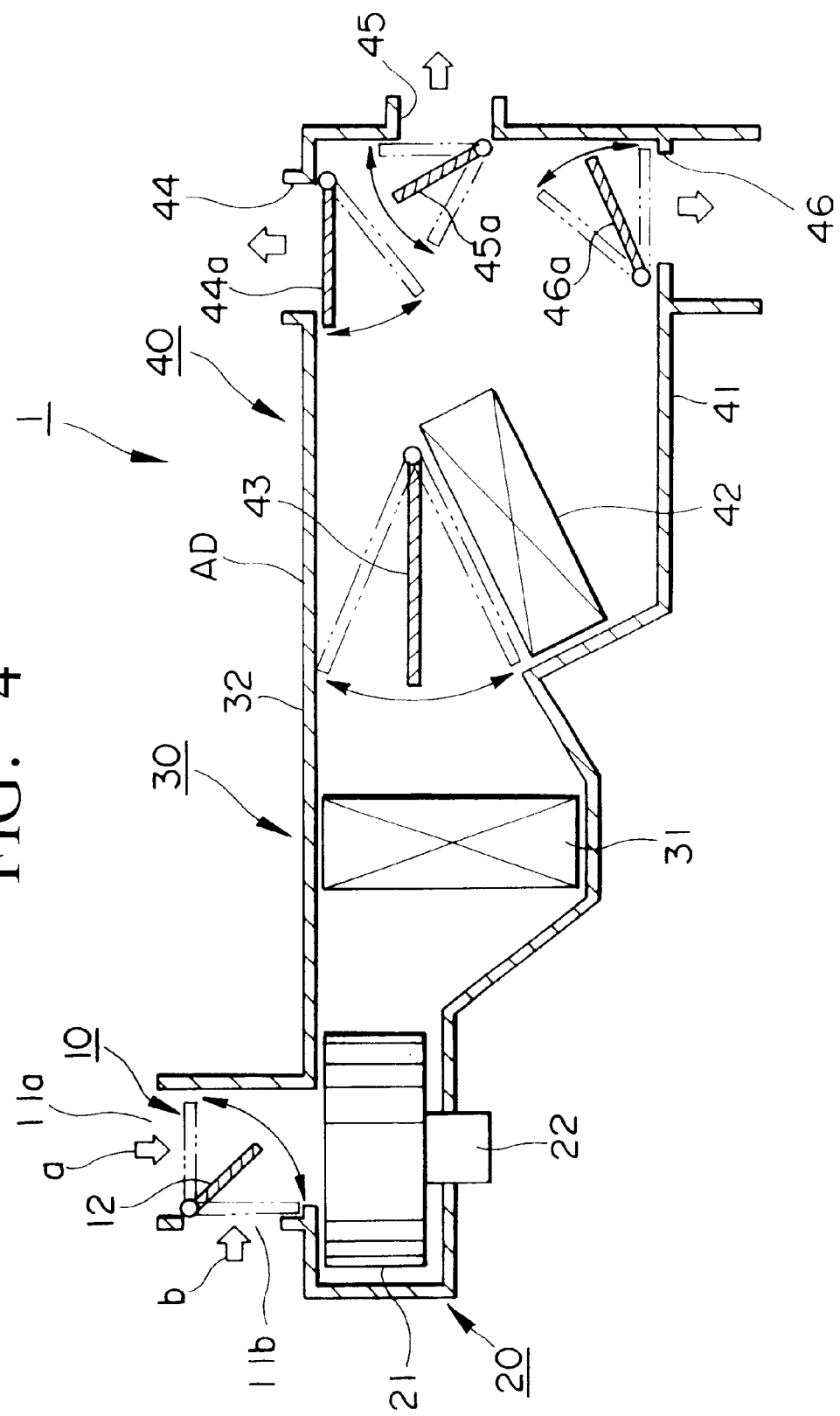
FIG. 4 is a cross-sectional view of an air conditioning unit.

Hereinafter, a first embodiment of the present invention is described with reference to the attached drawings. FIGS. 4 to 6 show a structure of an on vehicle air conditioning system provided with a condenser. This air conditioning system includes on the whole an air conditioning unit 1 for executing air conditioning such as air cooling, a coolant system 2 for supplying engine cooling water as a heat source to the air conditioning unit 1 under an air cooling condition, a heat source system 3 for supplying engine cooling water as a heat source to the air conditioning unit under an air heating condition, and a controller 4 for controlling operations of the system as a whole.

Figure 5:
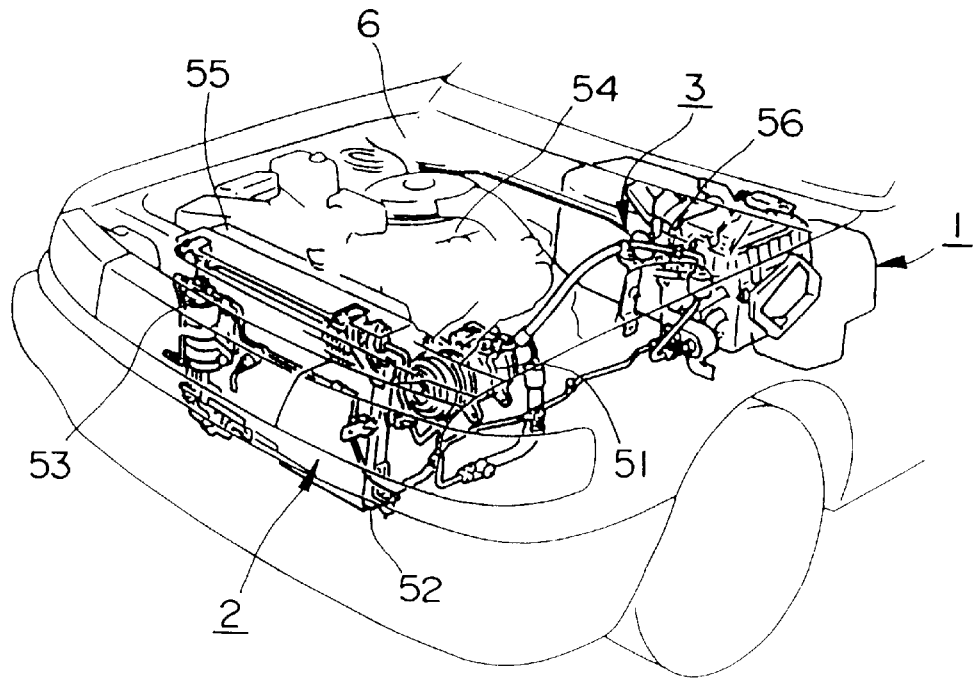
FIG. 5 is a perspective view showing the inside of an engine compartment.
Figure 6:
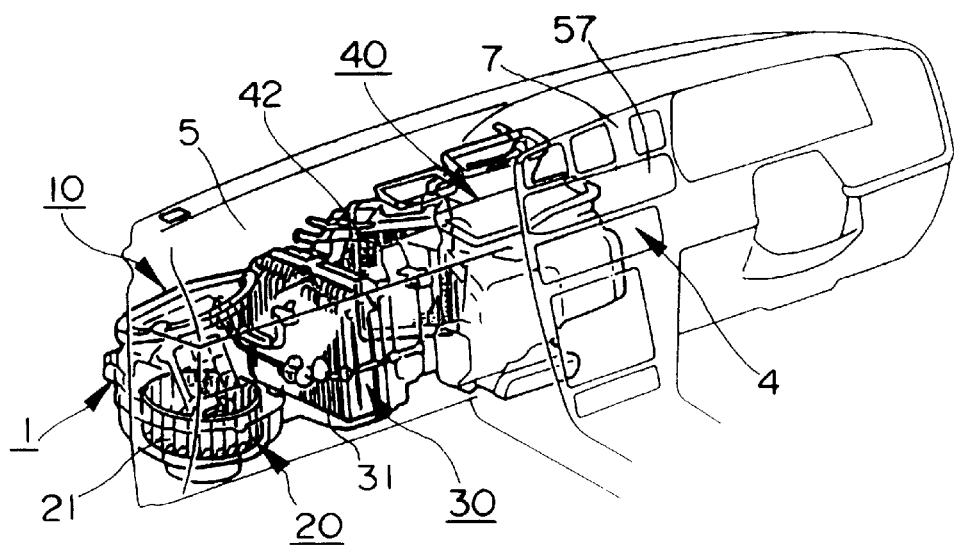
FIG. 6 is a perspective view of the engine compartment when viewed from the inside of the engine compartment.
Figure 7:
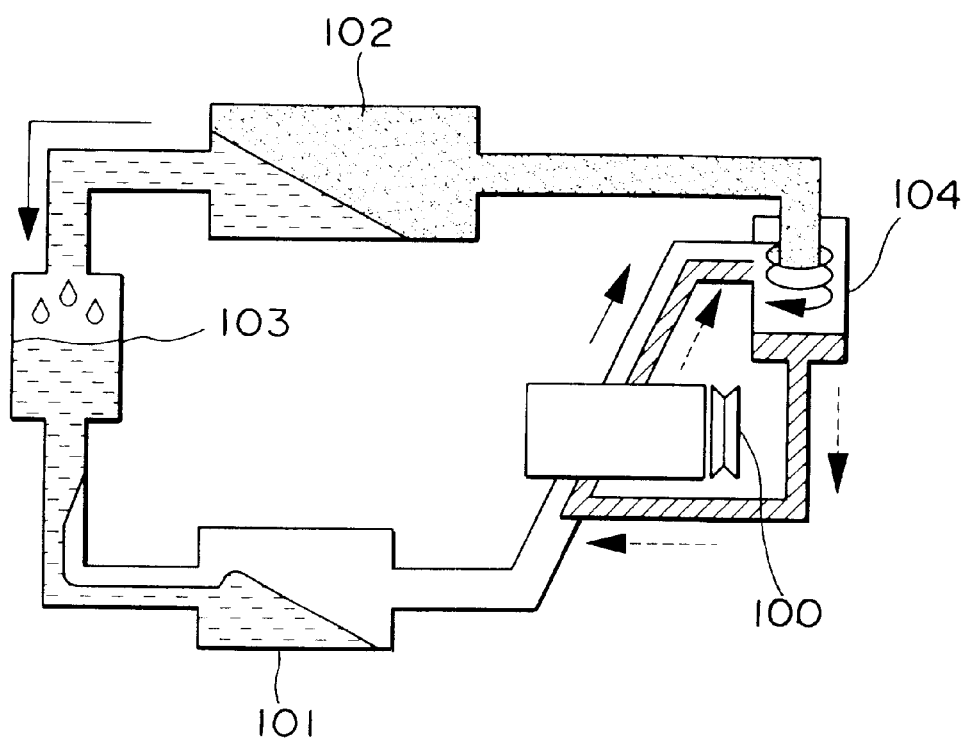
FIG. 7 is a schematic diagram showing the conventional technique.

As shown in FIG. 4, the air conditioning unit 1 is an integrally connected unit, which includes an outdoor/indoor air chamber 10, a blower unit 20, a cooler unit 30, and a heater unit 40. As shown in FIGS. 5 and 6, this air conditioning unit 1 is disposed in, for example, a passenger car, at the rear portion of an engine compartment 6 located on the side of the front passenger seat, that is, on the left side of the car when viewed from the inside of the car and at the lower side of the dash-board 5 longitudinally from side to side. Hereinafter, this air conditioning unit 1 is explained following the order of air flow.

The outdoor/indoor air unit 10 has the function of selecting and switching the air to be introduced into the air conditioning unit 1 from among outside air (a) (air from the outside of the car compartment) or inside air (b) (air from the inside of a car compartment). The outdoor/indoor air unit 10 includes an outside air inlet 11a communicating with the outside of the car and an inside air inlet 11b communicating with the inside of the car, and air to be introduced is selected by closing either one of the outside air inlet 11a or the inside air inlet 11b.

The blower unit 20 is disposed so as to connect with the downstream of the outdoor/indoor air unit 10 and has the function of sending air to a cooler unit described later, after selectively sucking outside air (a) or inside air (b) by operating the blower fan 21. This blower fan 21 is driven by an electric motor 22, and this blower fan is constructed so as to be able to switch air throughput at a plurality of levels in addition to the stop position. Here, when outside air is introduced while the car is travelling, it is possible to introduce travelling outside air into the cooler unit 30 even when the blower fan 21 is stopped. Depending upon the type, there are some air conditioning units which are arranged downstream of the cooler unit 30, described hereinafter.

The cooler unit 30 has the function of cooling and dehumidifying air introduced from the blower unit 20. This cooler unit 30 includes an evaporator 31 corresponding to a heat exchanger and a cooler unit casing 32 which encloses the evaporator 31.

The evaporator 31 receives low temperature and low pressure liquid coolant from the coolant system 2, described later, and heat exchange is carried out between air introduced from the blower unit 20 and passing through the evaporator 31, and the liquid coolant. Consequently, air thus introduced is converted into cold air by being cooled and dehumidified and the cold air is conducted to a heater unit 40.

The cooler unit casing is a formed component made of a resin, and the upstream end of the cooler unit casing 32 is connected with the blower unit 30, and the downstream end of the cooler unit casing 32 is connected to a heater unit 40 for forming a channel for flow of the air thus introduced.

The heater unit 40 has the function of selectively heating air introduced from the cooler unit 30, and to blow conditioned air from an outlet port in response to a driving mode.

This heater unit 40 includes a heater unit core 42 provided in a heater unit casing 41, an air mix damper 43 or adjusting the flow rate of introduced air passing through the heater core 42, a defroster outlet 44, a dashboard outlet 45, and legroom outlet 46 provided respectively with a defroster damper 44a, a dashboard damper 45a, and a legroom damper 46a which are respectively formed at openings in the heater unit casing 41 and which are respectively capable of opening and closing.

The heater core 42 receives a supply of cooling water used for cooling the high temperature engine from the heat source system 3 when the vehicle travels under heating conditions for heating air introduced from the cooler unit 30. The air introduced into the heater unit 40 is divided, in accordance with the degree of opening of the air mix damper 43, into two portions; one passes the heater core 42 for being heated and another does not pass the heater core.

The above-described defroster outlet 44 has the function of blowing heated and dehumidified air directly onto the inner surface of the windshield for eliminating frost of the windshield before the vehicle travels in winter and for eliminating fogging of the windshield when the vehicle travels in a rainy weather, and this type of air conditioning mode is called a defroster blowing mode. The dashboard outlet 45 is used for blowing cold air towards the upper bodies of the occupants when the vehicle travels under cooling conditions in the summer, and this type of air conditioning mode is called a dashboard blowing mode.

In addition, the legroom outlet 46 is used for blowing warm air toward the feet of occupants when the vehicle travels under heating conditions, and this type of air conditioning mode is called a legroom blowing mode. There is another air conditioning mode, mainly used in the spring and fall, called a bi-level air blowing mode, in which air conditioned air is blown from both the dashboard outlet 45 and the legroom blowing mode 46. In this air conditioning mode, the temperature of air blown from the dashboard outlet 45 is generally set lower than the temperature of air blown from the legroom outlet so as to realize the condition of cooling the head and warming the feet.

Next, the structure of the coolant system 2 is described with reference to FIGS. 1 and 5. This coolant system 2, used for supplying low temperature and low pressure coolant, includes a compressor 51, a condenser 52, and a receiver 53, and an expansion valve (V). The compressor 51 has a function of compressing low temperature and low pressure gas coolant which has been evaporated in the evaporator 31 by absorbing heat in the passenger compartment and to send the thus compressed high temperature and high pressure gas coolant to the condenser 52. When the air conditioning unit is for use in a car, the compressor 51 is driven by a belt and clutch mechanism connected with the engine 54.

The condenser 52 is disposed in front of the engine compartment 6 and has the function of cooling the high temperature and high pressure gas coolant supplied from the compressor 51 with outside air for condensing the gas coolant to a liquid coolant through condensation and liquefaction. The thus produced liquid coolant is sent to the receiver 53 for gas-liquid separation and is delivered to the expansion valve (V). The high temperature and high pressure liquid coolant is subjected to pressure reduction and expansion in the expansion valve (V) to convert the liquid coolant into low temperature low pressure liquid (atomized) coolant for deliver to the evaporator 31. The expansion valves (V) are disposed generally with the evaporators 31 at suitable positions in the coolant unit 30.

Next, the heat source system 3 is briefly described with reference to FIGS. 5 and 6. This heat source system 3 is used for supplying high temperature engine cooling water as a heat source to the heater core 42 and the heat source system 3 introduces a part of the engine cooling water, which circulated between the engine 54 and the radiator 55, into the air conditioning system after controlling the flow-rate by a water valve 56.

Finally, the controller or the control circuit 4 is briefly explained with reference to FIG. 6. This controller 4 is used for controlling the air conditioning unit 1, the cooling system 2 and the heat source unit 3, which constitute the air conditioning unit. The control circuit 4 is normally integrated with a control panel, which is used by the occupants for setting various conditions, and the integrated control panel is disposed at the center of the instrument panel 7. The controller 4 is capable of executing switching operations of the outdoor/indoor air switching damper, selecting and switching operation of various driving modes, switching the air throughput the blower fan 21, and setting operations of a desired temperature.

Hereinafter, the above-described coolant system 2 and the condenser 51 which is one of the constituting elements of the coolant system 2 are described with reference to FIGS. 1 and 2. The functions of the elements constituting the coolant system 2 are explained not in detail but very briefly in order avoid duplication.

Figure 1:
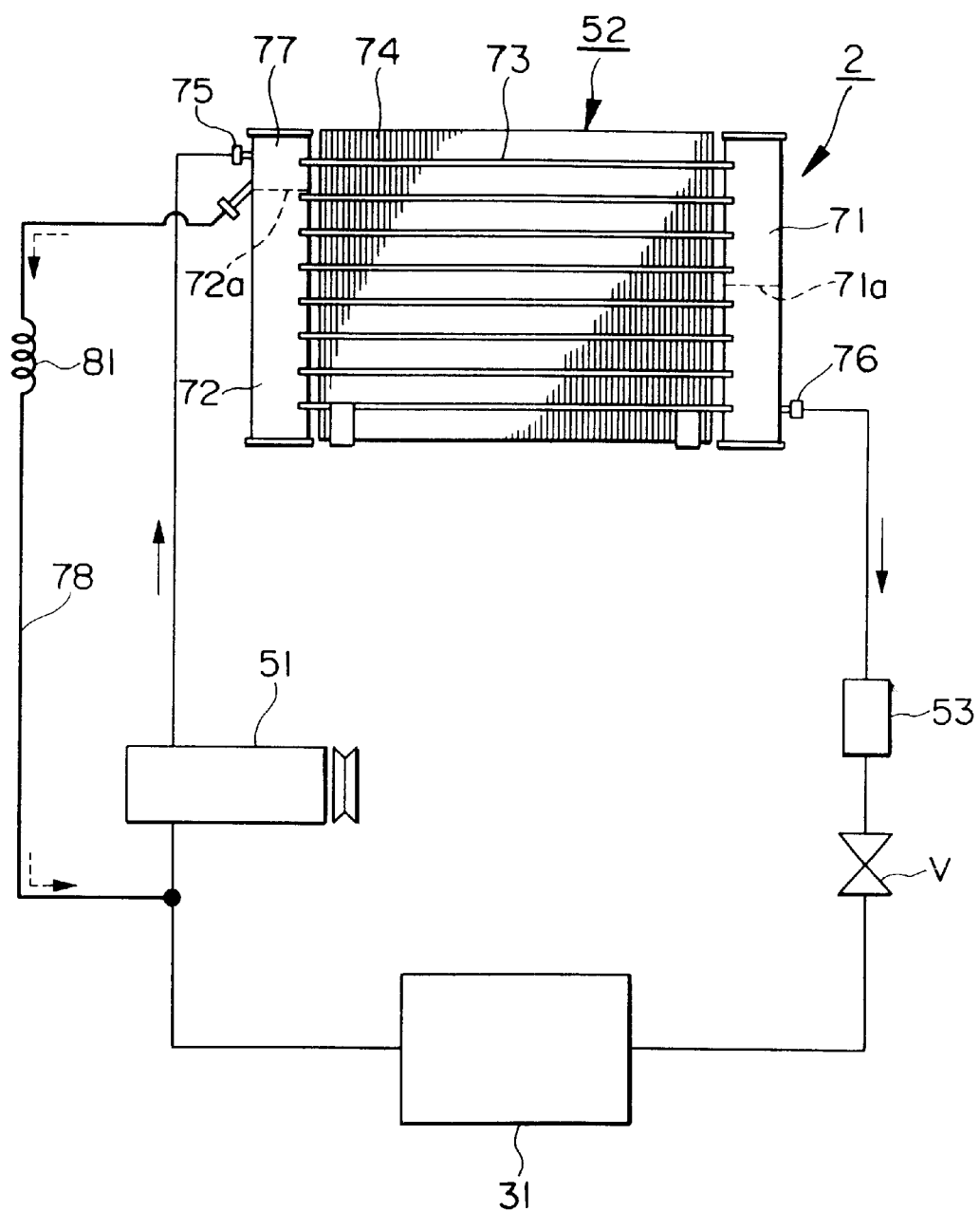
FIG. 1 is a diagram for explaining a cooling system having a condenser according to the first embodiment of the present invention.
Figure 2:
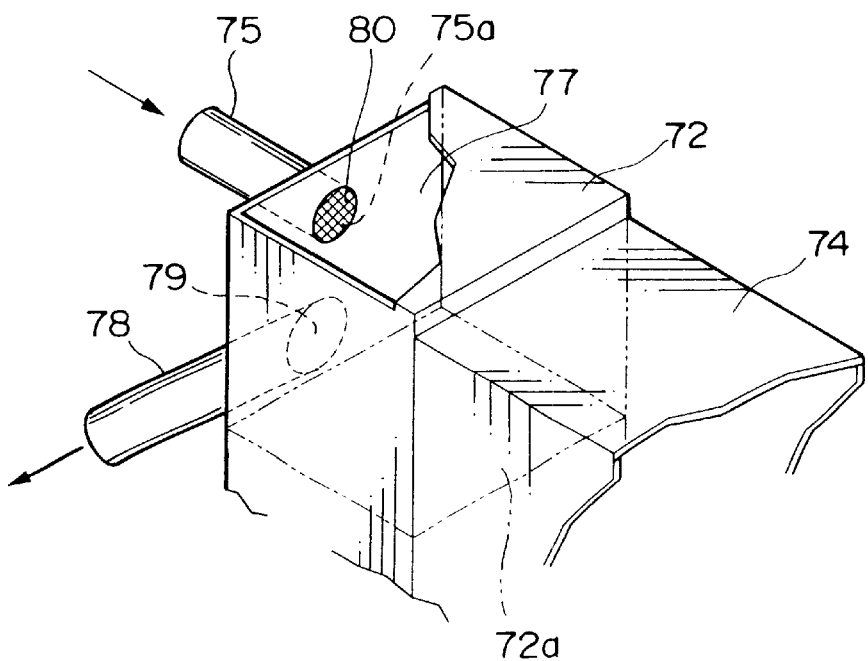
FIG. 2 is an enlarged perspective view of the main portion of the first embodiment of the present invention.

In FIG. 1, the condenser 52 is communicated with a plurality of coolant tubes 73 arranged in horizontal directions between two headers 71 and 72 disposed on both left and right sides, and a number of fins 74 arranged in between those coolant tubes. The inlet 75 of the coolant is disposed on the upper side of the header 72 and the outlet 76 of the coolant is disposed at the lower side of the header 71.

In addition, the receiver 53 is connected to the outlet 76 of the coolant and the expansion valve (V), the evaporator 31, and the compressor 51 are connected in sequence with the receiver 53. In FIG. 1, partition walls 71*a*, 72*a* are provided in the headers 71 and 72. The partition wall 72*a* defines a coolant intake chamber 77 provided with a coolant supplying path at the upper side of the header 72.

A coolant inlet 75 is open at the upper side of the coolant intake chamber 77, and a recovery port 79 of a return path 78 communicating with the intake side of the compressor 51 is open at the lower side of the coolant intake chamber 77. A mesh 80 is provided at an opening portion 75*a* of the coolant inlet 75. A restrictor 81 is provided in the above-mentioned return path 78.

In this constructed condenser 52, a lubricant oil for the compressor 51 is collected by the mesh 80 at the time of entering into the coolant intake chamber 77 from the coolant inlet 75 of the condenser 52. As the amount of the lubricant oil increases, the lubricant oil, flowing down along the wall of the coolant intake chamber 77, is recovered at the recovery port 79 of the return path 78, and the lubricant oil is supplied to the intake side of the compressor 51 after being subjected to pressure reduction by the restrictor 81. Therefore, the lubricant will not flow in the condenser 52 and harmful effects such as reduction of the heat efficiency will occur due to adhesion of the lubricant oil on the heat exchanging plates.

Since the recovered oil is only circulates in the coolant intake chamber 77, the lubricant oil will never have any harmful influences on the evaporator 31 or the receiver 53. It is an advantageous feature of the present invention that the condenser according to the first embodiment of the present invention utilizes the coolant intake chamber very effectively just like an oil separator, so that it is not necessary to provide an additional installation space for installation of the oil separator. In the above embodiment, an example is described, in which a partition wall 72*a* is used for defining the coolant intake chamber 77. However, in the case of using alternative types of condensers which are not provided with the partition wall, it is a matter of course that the recovery port 79 of the return path 78 should be fitted at the bottom wall of the header 72.

Figure 3:
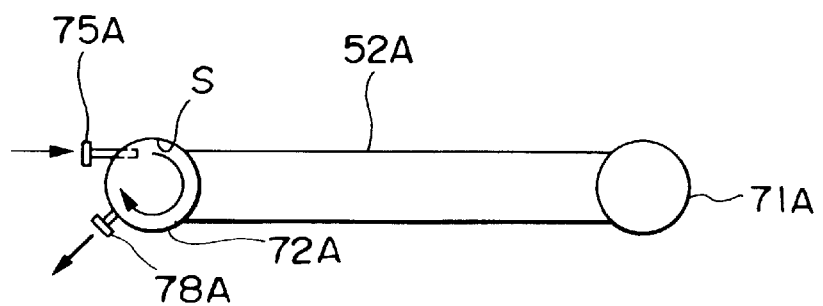
FIG. 3 is a schematic plan view of the second embodiment of the present invention.

Next, an alternative condenser according to the second embodiment of the present invention is described with reference to FIG. 3. FIG. 3 is a bird-eye view of the condenser according to this embodiment.

The condenser 52A of this embodiment has the feature that headers 71A and 72A are formed in the cylindrical form. The coolant inlet 75A is formed so as to accept the coolant from the direction along a peripheral wall (S), and a return path 78A, communicating with an intake side of the compressor 51, is connected below the coolant inlet 75A of this header 72. In addition, an end portion of the opening of the coolant inlet 75A protrudes inside of the header 72A.

Therefore, in the condenser 52A according to the present embodiment, the lubricant oil supplied with the coolant into the header 72A flows along the peripheral wall (S) by cyclone action while being subjected to centrifugal separation and is supplied to the compressor 51 through the return path 78A before the lubricant oil enters into the condenser 52A. In particular, protrusion of the end portion of the coolant inlet 75A opening allows blowing of the coolant smoothly inside of the header 72A. It is noted that if the cyclone action is effective, the end portion of the coolant inlet 75A opening is not necessarily required. In addition, if the mesh used in the first embodiment is applied to the present embodiment, a combination of the centrifugal separation due to the cyclone action and scavenging by the mesh 80 further improves the recovery efficiency of the oil. In this case, it is an optional matter whether or not the end portion of the coolant inlet opening is protruded.

Therefore, the present invention exhibits the effect that adoption of the condensers 52 and 52A of the present invention in the coolant system 2 allows lubrication of a compressor 51 without using an independent oil separators. In addition, the present invention exhibits another effect in that, when these condensers 52 and 52A are used in the on vehicle air conditioning system, high heat exchange efficiency of these condensers 52 and 52A used in the coolant system 2 allows providing for favorable operational margins in the air conditioner, especially in cooling air conditioning, which generates further comfort in the car compartment.

What is claimed is:

1. A condenser comprising:
   a plurality of headers connected with a plurality of coolant tubes and a plurality of fins;
   a coolant inlet having an opening portion and provided in one of said plurality of headers;
   a mesh disposed at said opening portion of said coolant inlet; and
   a return path communicating with an intake side of a compressor and disposed at a lower side of the coolant inlet in said one of said plurality of headers.

2. A condenser according to claim 1, further comprising a restrictor provided in said return path.

3. A coolant system including an evaporator and at least one condenser, wherein said at least one condenser comprises the condenser according to claim 1.

4. An on vehicle air conditioning system including the condenser according to claim 1.

5. A condenser according to claim 1, further comprising a partition wall disposed inside said one of said plurality of headers, said partition wall forming a coolant intake chamber inside said one of said plurality of headers, wherein said coolant inlet and said return path communicate through said coolant intake chamber.

6. A condenser comprising:

a plurality of headers connected with a plurality of coolant tubes and a plurality of fins;

a coolant inlet provided in at least one of said plurality of headers; and a return path communicating with an intake side of a compressor and disposed at a lower side of the coolant inlet, wherein said at least one of said plurality of headers has a cylindrical inner wall, and the coolant inlet is configured to discharge coolant along said cylindrical inner wall of the at least one of said plurality of headers.

7. A condenser according to claim 6, wherein said coolant inlet has an end portion which opens and protrudes towards an inside portion of the at least one of said plurality of headers.

8. A condenser according to claim 6, further comprising a mesh provided at an opening portion of said coolant inlet.

9. A condenser according to claim 6, further comprising a restrictor provided in said return path.

10. A coolant system including an evaporator and at least one condenser, wherein said at least one condenser comprises the condenser according to claim 6.

11. An on vehicle air conditioning system including the condenser according to claim 6.

* * * * *